United States Patent [19]
Kneller et al.
[11] 3,883,892
[45] May 13, 1975

[54] METHOD OF MAKING MAGNETIC RECORDINGS WHICH CANNOT BE ALTERED WITHOUT IT BEING NOTICED

[75] Inventors: Eckart Kneller, Bochum; Eberhard Koester, Frankenthal; Gerd Wunsch, Speyer; Paul Deigner; Dieter Graw, both of Ludwigshafen, all of Germany

[73] Assignee: BASF Aktiengesellschaft, Ludwigshafen (Rhine), Germany

[22] Filed: Oct. 16, 1973

[21] Appl. No.: 406,972

[30] Foreign Application Priority Data

Oct. 20, 1972 Austria............................8986/72

[52] U.S. Cl................. 360/59; 340/174 TF; 360/60; 360/131

[51] Int. Cl......................... G01d 15/12; G11b 23/28

[58] Field of Search............... 340/174 QA, 174 TF; 360/56, 59, 131; 346/74.1

[56] References Cited

UNITED STATES PATENTS 3,134,094 5/1964 Anderson.............................. 360/59
3,521,294 7/1970 Treves.................................. 360/59
3,582,912 6/1971 Valin........................... 340/174 QA
3,648,257 3/1972 Wiese.................................. 360/59

*Primary Examiner*—Bernard Konick
*Assistant Examiner*—Jay P. Lucas
*Attorney, Agent, or Firm*—Johnston, Keil, Thompson & Shurtleff

[57] ABSTRACT

The invention relates to a method of recording magnetic signals on magnetic recording media containing an exchange-anisoptropic material at a temperature lower than, equal to or higher than the Neel temperature of this magnetic material. After the recording has been made, the magnetic recording medium is heated to a temperature equal to, or higher than, the Néel temperature, then cooled down to a temperature below the Néel temperature and the recording temperature, following which it is provided with an indicator which betrays re-heating.

The method is suitable for the space-saving and, at the same time, authentic recording and storage of all data and images which are to be preserved without risk of falsification.

9 Claims, 2 Drawing Figures

METHOD OF MAKING MAGNETIC RECORDINGS WHICH CANNOT BE ALTERED WITHOUT IT BEING NOTICED

This invention relates to a method of recording magnetic signals on magnetic recording media, the recorded information being protected against subsequent undetectable alteration.

Figure 1:
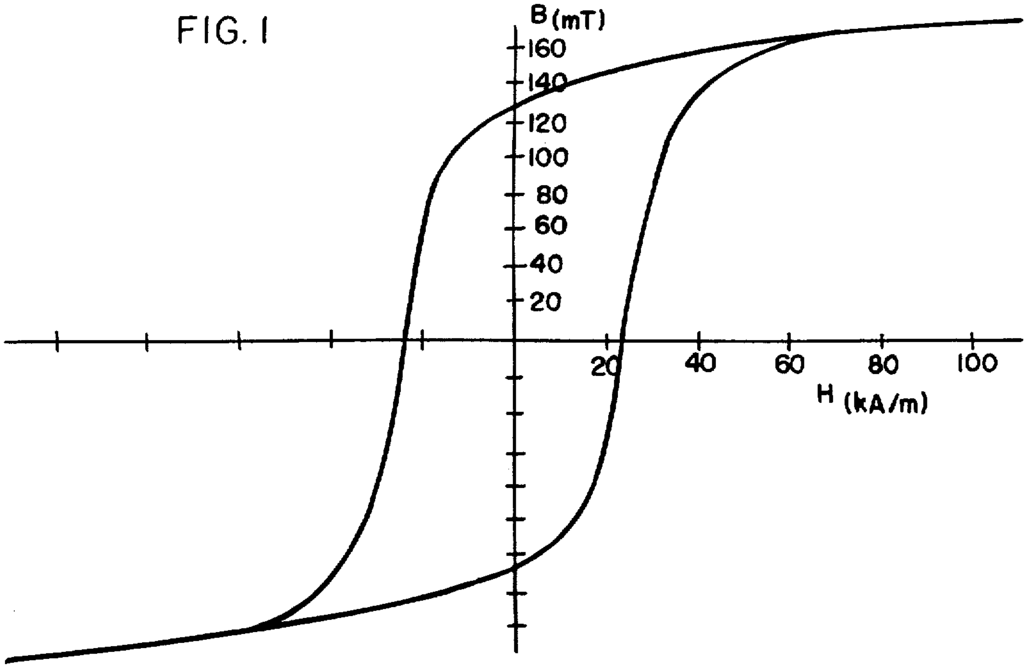
FIG. 1 displays a conventional symmetrical hysteresis loop.

Conventional magnetic recording media can be magnetized equally well along any chosen axis, in both directions. They exhibit a symmetrical hysteresis loop, such as is shown for example in FIG. 1.

Figure 2:
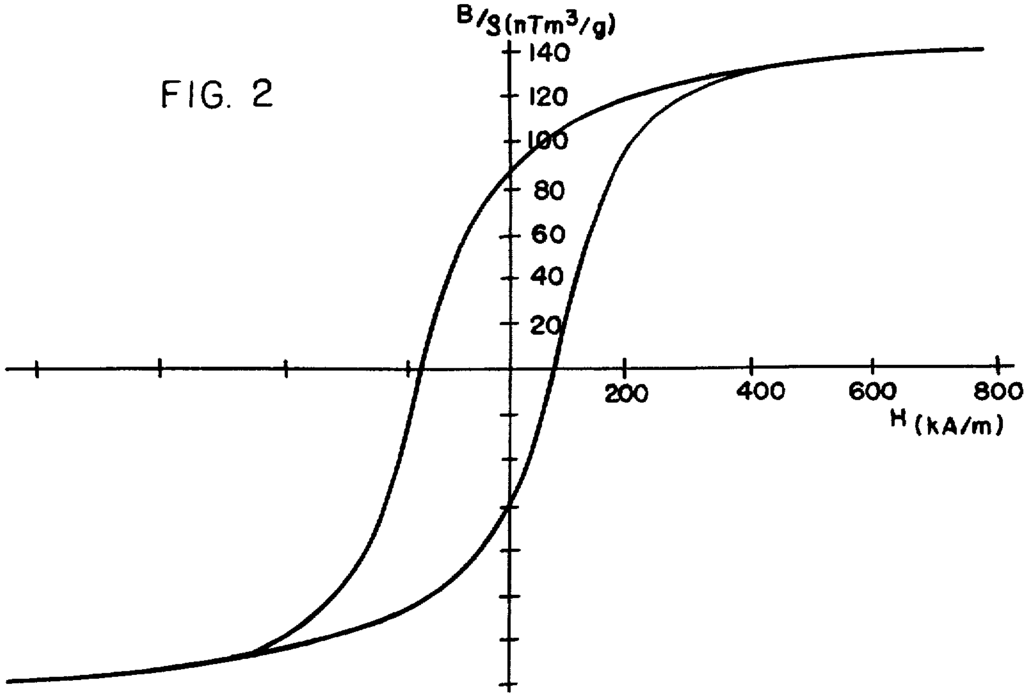
FIG. 2 displays an asymmetrical hysteresis loop according to the present invention.

Unlike ferro- and ferrimagnetic materials usually used in magnetic recording media, exchange-anisotropic magnetizable materials may in cases where the Néel temperature $T_N$ of the antiferromagnetic component is lower than the Curie temperature $T_C$ of the ferro- or ferrimagnetic component (cf. W. H. Meiklojohn, J. Applied Physics 33, 1328 (1962); E. Kneller, Handbuch der Physik, Vol. XVIII/2, pages 443–451, Berlin 1966) have only one direction in which they can be readily magnetized, i.e., an asymmetrical hysteresis loop (cf. FIG. 2). The exchange-anisotropic magnetizable material is cooled down in a magnetic field or in a remanent state below a temperature $T_N$ characteristic of the material concerned, i.e., below the Néel temperature of the antiferromagnetic component of the material. The same applies to a magnetic recording medium produced with such materials. The above-mentioned asymmetry manifests itself especially in a displacement of the hysteresis loop along the H-axis in FIG. 2. In this way, the remanence after saturation assumes different values for the two polarities.

It is an object of the invention to provide a method of making recordings of magnetic signals on magnetic recording media, for example recordings of speech, instrumentation or digital data of a documentary character, it being possible to use the latter for example as information on credit, check or identity cards, which recordings cannot be altered, i.e., falsified, without it being noticed.

We have now found that magnetic recordings which cannot be altered without it being noticed can be made very advantageously on magnetic recording media if, on a magnetic recording medium containing exchange-anisotropic magnetizable material, which material consists of a ferri- or ferromagnetic component to which there is coupled an antiferromagnetic component in respect of which, below a given temperature $T_S$ lower than the Néel temperature $T_N$ of the antiferromagnetic component, the critical magnetic field required to bring about the irreversible rotation of the antiferromagnetic axis and, in addition, the magnetic field needed for the production of any magnetization structure leading to the irreversible rotation of the antiferromagnetic axis are stronger than the strongest magnetic field $H_{sm}$ that can be produced with the technical means used in the magnetic recording of signals, so that all magnetization structures capable of being produced in magnetic fields smaller than, or equal to, $H_{sm}$ vanish again partly or completely after the magnetic field has been turned off, such that the signals previously fixed at a temperature above $T_S$ will either be completely or partly regenerated automatically or can be restored, a. the signals are recorded at a temperature above or below the temperature $T_S$ and the magnetic recording medium, after the recording has been made, is heated to a temperature above this temperature $T_S$ and at least to a temperature $T_{AFS}$,
b. the magnetic recording medium is then cooled to a temperature below the temperature $T_S$, and
c. is subsequently provided with an indicator irreversibly indicating the fact that the magnetic recording medium has been reheated to a temperature equal to or above $T_S$, and
d. the recording is then marked at both ends by physical or chemical means.

The temperature $T_{AFS}$ is not higher than the Néel temperature $T_N$ and is that temperature at or above which the antiferromagnetic axis may undergo irreversible rotation even as a result of the remanent magnetization having been produced below the temperature $T_S$ and without the influence of an external magnetic field. As a rule, the magnetic recording medium is heated during recording to a temperature above the Néel temperature $T_N$.

As is well known, an exchange-anisotropic magnetizable material consists of at least two magnetically coupled phases of which one — phase A — is a ferro- or ferrimagnetic substance and the other — phase B — an antiferromagnetic substance.

Above a temperature characteristic of each material, the above-mentioned magnetic substances change from the magnetically ordered ferro-, ferri- or antiferromagnetic state to the disordered paramagnetic state. In the case of ferro- and ferrimagnetic materials, this temperature is referred to as the Curie temperature $T_C$ and, in the case of antiferromagnetic materials, as the Néel temperature $T_N$. An asymmetrical hysteresis loop is obtained if the Curie temperature $T_C$ of phase A is higher than the Néel temperature $T_N$ of phase B and the material composed of these two phases is cooled, for example, from a temperature between $T_C$ and $T_N$ to a temperature below $T_N$ in a magnetic field.

Exchange-anisotropic magnetizable materials suitable for the method of the invention are materials in respect of which, below a temperature $T_S$ characteristic of the material, the critical magnetic field required to bring about the irreversible rotation of the antiferromagnetic axis and, in addition, the magnetic field needed for the production of any magnetizing structure leading to the irreversible rotation of the antiferromagnetic axis are stronger than the strongest magnetic field $H_{sm}$ that can be produced with the technical means used in the magnetic recording of signals, so that all magnetization structures capable of being produced in magnetic fields smaller than, or equal to, $H_{sm}$ vanish again partly or completely after the applied magnetic field has been turned off, such that the signals previously fixed at a temperature above $T_S$ will either be completely or partly regenerated automatically or can be restored.

This ensures that any information which has been stored in the above-described manner cannot be irrevocably destroyed below the temperature $T_S$ even by the strongest magnetic fields $H_{sm}$ realizable with the technical means used for the magnetic recording of magnetic signals, i.e., cannot be replaced by other information in such a way that the original information is either no longer recognizable or capable of restoration. For the purposes of the present invention it is usually sufficient if the information stored in the above-described manner on a magnetic recording medium produced with this material is still recognizable or capable of restoration after having been subjected to the influence of, for example, an ac field decreasing from a maximum amplitude of 1,000 kiloamps/m to zero.

Materials which are suitable in this respect are those whose Néel temperature $T_N$ is between about 40° and about 500°C, particularly between about 65° and about 300°C.

The skilled worker can easily ascertain whether or not a material is suitable for use according to the present invention by making a few measurements. A material from the alloy series $Co_xNi_{(1-x)}$ for phase A and $(CoO)_x(NiO)_{(1-x)}$ for phase B was found to be very suitable for the purposes of the invention. $x$ may denote any value between 0 and 1, and especially values from 0 to a value at which the Neel temperature $T_N$ of the antiferromagnetic substance moves too close to the Curie temperature $T_C$ of the ferromagnetic substance for use in practice. In a preferred embodiment, $x$ is between 0.4 and 0.9. The material is preferably in the form of small particles whose longest axes on an average are not shorter than 0.01 $\mu$ and not longer than 5 $\mu$ and which are dispersed in a polymeric binder for example. A base suitable for the intended application (tape, film, disc, card, etc.) consisting of a non-magnetizable material is then coated in a conventional manner with this dispersion. However, it is also possible to produce magnetic recording media by applying the magnetizable material to the desired base not as a pigment dispersion, but as a coherent film of a thickness of preferably 0.1 to 1 $\mu$.

For the purposes of the present invention the magnetic recording medium may also comprise a mixture of magnetizable material with and without exchange-anisotropic properties, the proportion of material with exchange-anisotropic properties being at least high enough for the signal stored by the exchange-anisotropic material to be still recognizable or capable of restoration.

During the development of the method of the invention using the above-mentioned magnetic materials exhibiting exchange-anisotropic properties it was found that, in order to achieve an asymmetrical hysteresis loop, it is not absolutely necessary to cool the exchange-anisotropic material or the magnetic recording medium produced with such material in a magnetic field. It is sufficient to produce a state of remanence at a temperature above the Néel temperature $T_N$ characteristic of the material and then to cool to a temperature below $T_N$ in the absence of a magnetic field. It is even sufficient to produce a remanent state at a temperature below $T_N$ and to heat the material or the magnetic recording medium briefly to a temperature above $T_N$ or at least to the temperature $T_{AFS}$ in the absence of a magnetic field and then to cool it down. In each case it was found that the remanence existing after an ac field had decreased to zero was substantially proportional to the remanence originally produced.

If a magnetic material containing an exchange-anisotropic substance in addition to the customary ferro- or ferrimagnetic substance, or a magnetic recording medium produced with such material, after the production of an asymmetrical hysteresis loop, is kept by means of one of the above-described methods at a temperature below $T_S$, then it is possible for this remanence to be varied by the application of a magnetic field and even for its polarity to be reversed, but this change can be reversed at any time by an ac field decreasing from a high amplitude to zero, in which case part of the original remanence is preserved or can be restored.

The practical application of the method of the invention will now be explained in further detail with reference to the use of a magnetic tape having a magnetic coating which consists of a dispersion of particles approximately 0.03 $\mu$ in size of a surface-oxidized cobalt-/nickel alloy according to the following Example, used as the magnetizable material with exchange-anisotropic properties:

The magnetic recording medium is guided in a conventional manner past the recording head of a commercial tape recorder, by means of which head a magnetic-signal field corresponding to the low-frequency sound waves is produced which acts on the magnetizable layer. Superimposed on this low-frequency ac field is a high-frequency bias field which ensures in known manner a sufficient linear relationship between the signal field and the remanence of the magnetic recording medium. According to the invention, the magnetic recording medium can then be heated at or near the point where recording is effected or after the recording operation is over, to a temperature above the temperature $T_N$ characteristic of the exchange-anisotropic magnetic material employed (approximately 65°C), for example to a temperature of 80°C; this may be achieved for example by heating the recording head, subjecting the recording medium to electromagnetic radiation, by passing the magnetic recording medium over a heated metal surface or heating the entire length of the wound medium following recording. Since it would be possible at any time to make a new recording on the magnetic recording medium in the same way, the medium, after being heated to a temperature above the Néel temperature of the magnetic material and subsequent cooling to a temperature below the Néel temperature is protected according to the invention against subsequent undetectable alteration of the recording by the application of an indicator irreversibly betraying the heating of the magnetogram carrier to about 40°C. The indicator is usually chosen such that it reacts in any case at least when the temperature $T_S$ is attained or even shortly before this temperature is attained. Some suitable indicators are available commercially and, depending upon the chosen type, exhibit a color change or color reaction when a certain temperature is reached. For example, components producing a chromatic reaction such as polyphenols and iron salts, e.g., resorcinol and iron stearate, may be embedded separately in resin, wax, lacquer or other binder melting at a specific temperature. When the resin or wax melts, these components react while undergoing a color change, or one or more of the chromophoric components melt. Apart from indicators in which chemical reactions are triggered by heating to a certain temperature (so-called thermocolor systems), it is also possible to employ as indicators substances which undergo a physical reaction at the desired temperatures, e.g., firmly adhering substances which melt at a certain temperature. To obtain firmly adhering indicators, it is often advantageous to apply them in a solvent or dissolved or dispersed in an adhesive binder, e.g., as a stripe or a coating on the magnetic recording medium, for example on the side of the medium bearing the magnetic coating.

As a safeguard against editing of the recording or cutting of the recording medium it is sometimes advisable to also record a control signal — either at the time the recording is made or at a later time — with which it is possible to check the original recording sequence. With the aid of such a control signal, it would also be possible, for example, to identify a copy of such a recording medium in which part(s) of the original information had been modified and which had subsequently been treated in the above-described manner.

The recording may also be protected against editing and marked as an original by markings applied either physically, e.g., mechanically, or chemically at both ends thereof.

Since the magnetic recording medium has been protected in the above manner against subsequent undetectable heating to above $T_S$, attempts at altering the recorded information can only be made at temperatures below $T_S$. In contrast to conventional magnetic recording media, the previously protected recording is not erased by a subsequent recording operation, since the bias field has the same effect as the previously mentioned ac field which decreases to zero. The protected recording will remain stored on the medium at somewhat reduced strength, in addition to the new recording. When the recording medium is again transported past the recording head which now only produces the high-frequency bias field, the new recording is erased and only the protected original information remains. The same applies if a constant magnetic field is temporarily applied to the magnetic recording medium of the invention.

If a magnetic recording medium produced according to the invention with an exchange-anisotropic material is employed for recording digital data, the medium is likewise heated to above $T_N$ either at the time the information is recorded or later and is then provided — as has already been described — with an indicator to protect it against subsequent heating to above $T_S$. If, on a magnetic recording medium according to the invention, regions of opposed remanence follow each other with corresponding hysteresis loop displacements in opposite directions, then, after the application of a dc field, regions of remanence of the same polarity but different value remain (see FIG. 2). The originally stored information is not destroyed. Moreover, an ac field which decreases to zero restores the original condition of consecutive regions of remanence of opposite polarity. Here again, a subsequent recording of data made at a temperature below $T_S$ remains without effect.

Magnetic recordings made according to the invention virtually possess the authenticity of documents. The method of the invention is therefore suitable for making recordings of important data which cannot be falsified without it being detected, for the authentic and, at the same time, space-saving recording and storage of documents, contracts, business papers, legal documents, patent documentation, accounting records, archives, etc. The method is also suitable, for example, for magnetically recording documentary and, if necessary, coded data on credit cards, check cards, identity cards, vehicle documents, etc. In view of the high recording density in comparison with written information, a wide field for innovation in administration and information techniques is created. The method can also be used for recording images, i.e., video signals, which cannot be falsified without it being noticed.

EXAMPLE

In a four-neck flask having a capacity of 6 liters and provided with a gas inlet tube, a propeller agitator, a thermometer and a dropping funnel, 200 g of sodium hydroxide are dissolved in 2,750 ml of water. At a temperature of 80°C and a stirring speed of 300 rpm while passing through 150 l of nitrogen per hour 356 g of $CoCl_2.6H_2O$ and 118 g of $NiCl_2.6H_2O$, dissolved in 1,250 ml of water, are dripped into the flask in the course of 1 hour. When the salt solution has been added, stirring is continued at 80°C for a further 3 hours. The precipitated $Co_{0.75}Ni_{0.25}(OH)_2$ is filtered off, washed with distilled water and dried in vacuo at 120°C.

100 g of the dried product are reduced in a rotary kiln at 300°C, 300 l/h of hydrogen being introduced for 8 hours. The residual oxygen content is 0.93 percent by weight. The pulverulent metal is treated for 2 hours at room temperature with a mixture of 10 l/h of air and 200 l/h of nitrogen. The product thus threated is tempered for 4 hours at 400°C under nitrogen. Now the oxygen content is 7.8 percent by weight.

The material thus obtained is characterized by a saturation induction $B_s/\rho$ of 61.4 $nTm^3/g$ in a field of 160 kiloamps/m, a remanence $B_r/\rho$ of 26.0 $nTm^3/g$ and a coercive force $H_c$ of 48.3 kA/m, a Néel temperature $T_N$ of 65°C and a temperature $T_S$ of about 40°C. It is dispersed in the solution of a binder based on a partially saponified vinyl chloride/vinyl acetate copolymer, applied to a polyester film and dried. The tape thus obtained has a $B_s$ value of 0.16 T, a $B_r$ value of 0.08 T and an $H_c$ value of 47.9 kA/m. Using a commercial tape recorder, a signal of varying amplitude is recorded on the tape at 1,000 Hz and then erased. Afterwards, no signal can be detected on the tape, Subsequently, another recording with a signal of varying strength is made on the tape at 1,000 Hz and the tape is then briefly heated to a temperature of 70° to 80°C. If the recording is now erased at room temperature, a signal will be found which is approximately 3 percent of the previously recorded signal. The signal was still preserved after an ac field of 1,000 kA/m had been applied. A continuous line of a thermocolor indicator which produces a chromatic reaction at 40°C, dissolved in a polymeric binder which firmly adheres to the magnetic coating, is applied to the tape.

We claim:

1. A method of making magnetic recordings on magnetic recording media which cannot be altered without it being noticed, wherein on a magnetic recording medium containing exchange-anisotropic magnetizable material, which material consists of a ferri- or ferromagnetic component to which there is coupled an antiferromagnetic component in respect of which, below a given temperature $T_S$ lower than the Néel temperature $T_N$ of the antiferromagnetic component, the critical magnetic field required to bring about the irreversible rotation of the antiferromagnetic axis and, in addition, the magnetic field needed for the production of any magnetizing structure leading to the irreversible rotation of the antiferromagnetic axis are stronger than the strongest magnetic field $H_{em}$ that can be produced with the technical means used in the magnetic recording of signals, so that all magnetization structures capable of being produced in magnetic fields smaller than, or equal to, $H_{sm}$ vanish again partly or completely after the magnetic field has been turned off, such that the signals previously fixed at a temperature above $T_S$ will either be completely or partly regenerated automatically or can be restored a. the signals are recorded at a temperature above or below the temperature $T_S$ and the magnetic recording medium, after the recording has been made, is heated to a temperature above this temperature $T_S$ and at least to a temperature $T_{AFS}$;

b. the magnetic recording medium is then cooled to a temperature below the temperature $T_S$, and c. is subsequently provided with an indicator irreversibly indicating the fact that the magnetic recording medium has been reheated to a temperature equal to or above $T_S$, and d. the recording is then marked at both ends by physical or chemical means.

2. A method according to claim 1, wherein the magnetic signals are recorded above the Néel temperature $T_N$ of the antiferromagnetic substance.

3. A method according to claim 1, wherein a magnetic recording medium with signals recorded below the Néel temperature $T_N$ of the antiferromagnetic substance is heated to a temperature above the Néel temperature $T_N$ of the antiferromagnetic substance and is provided with the indicator after cooling to below the temperature $T_S$.

4. A method according to claim 1, wherein either during or after the recording of the magnetic signals a control signal is recorded which enables subsequent editing of the recording or cutting of the magnetic recording medium to be detected.

5. A method according to claim 1, wherein the Néel temperature $T_N$ of the exchange-anisotropic material is between approximately 40° and approximately 500°C.

6. A method according to claim 1, wherein the exchange-anisotropic magnetizable material consists of an alloy containing the elements Co and Ni and having the composition $Co_xNi_{(1-x)}$, to which an oxide layer having the approximate composition $CoO)_x(NiO)_{(1-x)}$ has been applied, $x$ denoting any value between 0 and 1.

7. A method according to claim 1 wherein the critical magnetic field required to bring about the irreversible rotation of the antiferromagnetic axis and, in addition, the magnetic field needed for the production of any magnetizing structure leading to the irreversible rotation of the antiferromagnetic axis are stronger than 800 kiloamps/meter.

8. Magnetic recording media for recordings that cannot be altered without it being noticed, characterized in that they contain an exchange-anisotropic magnetizable material consisting of a ferri- or ferromagnetic component and an antiferromagnetic component, in respect of which, below a given temperature $T_S$ lower than the Neel temperature $T_N$ of the antiferromagnetic component the critical magnetic field required to bring about the irreversible rotation of the antiferromagnetic axis and, in addition, the magnetic field needed for the production of any magnetization structure leading to the irreversible rotation of the antiferromagnetic axis are stronger than the strongest magnetic field $H_{sm}$ that can be produced with the technical means used in the magnetic recording of signals, so that all magnetization structures capable of being produced in magnetic fields smaller than, or equal to, $H_{sm}$ vanish again partly or completely after the magnetic field has been turned off, such that the signals previously fixed at a temperature above $T_S$ will either be completely or partly regenerated automatically or can be restored, that they are heated, during or after the recording has been made, to a temperature above $T_S$ and, after cooling to a temperature below this temperature $T_S$, are provided with an indicator which indicates irreversibly any renewed heating of the recording media to or above the temperature $T_S$.

9. A magnetic recording media according to claim 8 wherein the critical magnetic field required to bring about the irreversible rotation of the antiferromagnetic axis and, in addition, the magnetic field needed for the production of any magnetizing structure leading to the irreversible rotation of the antiferromagnetic axis are stronger than 800 kiloamps/meter.

* * * * *